May 8, 1956      W. H. DAILEY, JR      2,744,687
FURNACE PRESSURE CONTROL
Filed Oct. 6, 1951
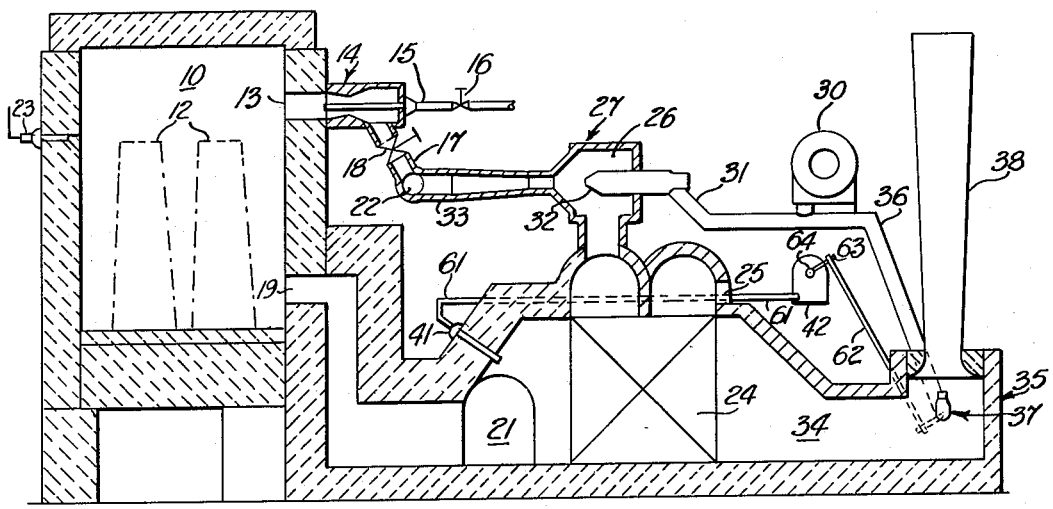
INVENTOR
William H. Dailey Jr.
BY
Charles S. Haughey
AGT.

United States Patent Office 2,744,687
Patented May 8, 1956

2,744,687

FURNACE PRESSURE CONTROL

William H. Dailey, Jr., near Toledo, Ohio, assignor to Surface Combustion Corporation, Toledo, Ohio, a corporation of Ohio Application October 6, 1951, Serial No. 250,090

5 Claims. (Cl. 236—15)

This invention relates to control of furnace atmosphere pressures by use of an air jet in an ejector stack, and to control of an ejector stack. It is common practice to employ ejector stacks with soaking pit installations to exhaust the flue gases from the furnace, and, where recuperators are used, to draw the flue gases through the appropriate passages of a recuperator. Under various conditions of firing rates, heat load in the furnace and the like the ejector should be controlled to produce just the desired draft upon the furnace, and in some cases, such as low firing rates in non-recuperative pits, a reverse jet is desirable to maintain the proper pressure in the pit. Jet nozzles in the flue gas stream are subjected to severe temperature conditions up to perhaps 2200° F. and varied conditions of oxidation as when proportioning controls are poorly adjusted or when a pit is uncovered for charging or discharging. This invention provides an improved jet nozzle and ejector system for exhausting gases from and controlling pressures within a soaking pit furnace chamber; and is herein described as applied to a one-way fired recuperative soaking pit battery.

For a consideration of what I believe to be novel and my invention, attention is directed to the following specification and the drawing and concluding claims thereof.

In the drawing,

Fig. 1 is a diagrammatic illustration of apparatus embodying this invention.

Fig. 2 is a partially sectional detail view of apparatus for turning the ejector stack jet nozzle of Fig. 1.

Fig. 3 is a sectional view of the apparatus of Fig. 2 on line 3—3.

Fig. 4 is a sectional view of the apparatus of Fig. 2 on line 4—4.

Fig. 5 is a diagrammatic illustration of control apparatus for turning the jet nozzle of Fig. 1.

Fig. 6 is a simplified illustration of the apparatus of Fig. 1 showing an alternate form of this invention.

The soaking pit comprises a combined combustion and heating chamber 10 which is normally closed by a removable cover 11, the chamber being of a size to contain a plurality of steel ingots 12 indicated in outline by discontinuous lines. Heating flame enters the chamber 10 from a firing port 13 whose inlet is coincident with the outlet of a burner 14 to which fuel is delivered by a supply pipe 15 having a control valve 16 and to which air for combustion is delivered by a duct 17 having a control valve 18. Flue gas (products of combustion) is vented from the chamber 10 through an exhaust port 19. The heating unit thus far described is not new and is usually one of several units having a common flue gas exhaust manifold 21 and a common burner air distributing manifold 22.

The rate of fuel supply to the furnace chamber 10 will ordinarily be determined by means, not shown, responsive to a radiation device 23 for measuring the temperature within the chamber, said means being adapted to adjust the fuel control valve 16 to maintain the desired furnace temperature. A predetermined ratio of fuel and air will ordinarily be delivered to the burner 14, according to conventional practice, as by adjusting the air valve 18 responsive to the adjustment of the fuel valve.

Air may be delivered to the air manifold 22 by any conventional means, and may be preheated by a recuperator as herein shown. Air is drawn into a recuperator 24 through entry port 25 and is heated in the recuperator before passing into the plenum chamber 26 of a jet pump 27 from which it is inspirated by a jet of air from a compressor 30, pipe 31, and jet nozzle 32 and delivered by pipe 33 and 22 to the air duct 17 and to the burner.

Flue gases from the chamber 10 pass through the exhaust port 19 to the exhaust manifold 21, through the recuperator 24, wherein some of its heat is transferred to the air drawn therethrough, and thence through exhaust duct 34 to an ejector 35 where a jet of air from the compressor 30, pipe 36 and a nozzle 37 inspirates exhaust flue gases from the duct 34 and delivers them through a venturi stack 38 of the ejector 35.

The exhaust flue gases passing the nozzle 37 in the ejector may be as hot as 2200° F. under some circumstances, especially where a recuperator is not used, but will ordinarily be about 1000° F. To avoid possible overheating of the nozzle 37 and to allow simplification of the apparatus, yet provide for control of the draft provided by the ejector, the nozzle 37 is operated at full air flow from the compressor, and is turned through a 90° arc from full draft position pointing through the stack to full damped position pointing upstream of the duct 34. The motive air passing through the nozzle 37 is thus a constant coolant, and especially when a furnace is at "soaking" temperature but is firing at a low or holding rate, the coolant air passing through the nozzle serves its pressure, or draft, control function yet prevents overheating and consequent destruction of the nozzle. It is thus possible to control pressure at a pressure tap 41 in the exhaust manifold 21, and thus hold substantially constant an indicated pit pressure as at the point of the radiation device 23, by a control device 42 adapted to control the position of the nozzle 37 responsive to a pressure upstream in the flue duct affected thereby.

The jet nozzle 37 comprises a T 45 on a support 59 adapted to receive air from pipe 36 and having therein two aligned bearing spiders 46, welded to the T, and supporting bronze bushings 47 centrally in the T 45. A shaft 48 is supported in the bushings and supports a nozzle portion 51 by spiders 52 which are welded to the shaft and to the nozzle portion. The nozzle portion 51 and the T adjoin at a turnable joint 53 whereat the nozzle portion slides on the T as it is rotated through a 90° arc by turning of the shaft 48 with respect to the T. A cap 54 encloses a spring 55 within a flange 56, the spring being retained on the shaft by a nut 58 and adapted to hold the nozzle portion against the T to prevent loss of air through the joint 53. Thus when the shaft 48 is turned as by an arm 57, the nozzle portion 51 may be rotated from full draft position in the ejector 35.

In a single pit installation the ejector may be operated responsive to pressure within the furnace chamber 10 proper through pressure tap 40 and pipe 39 (shown in dashed lines) to maintain constant pressure conditions therein under varying conditions of firing rates and the like, or in a battery installation as shown in Fig. 1 the ejector may be operated to maintain a constant pressure in a flue manifold common to several holes or pits.

To adjust the nozzle 37 responsive to flue manifold pressure, the control device 42 is connected to the flue manifold pressure tap 41 by a pipe 61 and to the arm 57 by a link 62 secured to an arm 63 on a shaft 64 of the control device 42, as shown in Fig. 5. The pipe 61 leads to a casing 65 within the device housing a diaphragm 66 which is biased by an adjustable cantilever spring 67, the other side of the casing from pipe 61 being vented to the atmosphere through pipe 70. The diaphragm 66 is connected by linkages 71 and 72 to the shaft 73 of a piston type 3-port valve 74 having a high pressure air inlet 75 and two outlet ports 76 and 77 connected by flexible pipes 78 and 79 to a pneumatic cylinder 81 which is adapted to turn the shaft 64 by a crank arm 82. The nozzle is manually adjustable when by-pass valve 83 is open.

The turnable jet ejector herein disclosed makes possible a simple yet accurately adjustable ejector whose jet nozzle is continuously internally cooled by flow of air therethrough regardless of the adjustment of the ejector, yet having no valves in the motive air supply pipe 36 to the jet nozzle to reduce air flow therethrough, and being capable of adjustment from full draft as for high firing rates on a cold pit, to a damped position which maintains the pit under desirable positive pressure even at low firing rates on a hot and "soaking" pit, counteracting the excessive draft of even the short stack at low, holding, firing rates.

What I claim is:

1. A furnace comprising, in combination, wall means forming a combustion and heating chamber and an outlet for flue gases therefrom, burner means for supplying heating gases to said chamber, flue means forming an exhaust flue from said outlet, an ejector in said flue for exhausting flue gases from said chamber, a motive fluid nozzle in said ejector turnably mounted therein whereby to direct said fluid upstream of said flue gases, downstream of said gases, or intermediate there-between, and control means responsive to pressure of said flue gases upstream of said ejector for turning said nozzle to maintain said pressure substantially constant.

2. A furnace according to claim 1 wherein said control means is responsive to pressures of said flue gases in said exhaust flue.

3. A furnace according to claim 1 wherein said control means is responsive to pressures of said flue gases in said chamber.

4. Control apparatus for a furnace comprising a combustion and heating chamber, an exhaust flue from said chamber and an ejector in said flue, said apparatus comprising, in combination, a nozzle in said ejector having a discharge port for discharge of motive fluid therein, support means for turnably supporting said nozzle, turning means for turning said nozzle in a manner to increase or decrease the efficiency of said ejector without decreasing the volume of fluid flowing through said nozzle, a servo-motor connected to said turning means for operating the same, a control device for controlling the operation of said servo-motor, pressure responsive means for adjusting said device, and duct means leading from said pressure responsive means to said furnace for transmitting from said furnace to said pressure responsive means a pressure impulse from flue gases upstream of said ejector in said furnace.

5. A furnace comprising, in combination, wall means forming a combustion and heating chamber and an outlet for flue gases therefrom, burner means for supplying heating gases to said chamber, flue means forming an exhaust flue from said outlet, an ejector in said flue for exhausting flue gases from said chamber, nozzle means for directing a motivating fluid into said ejector, means for supplying a substantially constant flow of fluid to said nozzle means, and control means responsive to pressure of said flue gases upstream of said ejector for controlling the direction of flow of said fluid and maintaining said pressure substantially constant.

References Cited in the file of this patent

UNITED STATES PATENTS

| 325,791 | Everson | Sept. 8, 1885 |
| 404,739 | Smith | June 4, 1889 |
| 544,522 | Lawler | Aug. 13, 1895 |
| 853,152 | Bennett | May 7, 1907 |
| 1,310,733 | Bore | July 22, 1919 |
| 1,848,184 | Mawha | Mar. 8, 1932 |
| 2,501,639 | Warren | Mar. 21, 1950 |

FOREIGN PATENTS

| 199,728 | Switzerland | Sept. 15, 1938 |